(12) United States Patent
Okubo et al.

(10) Patent No.: US 9,765,731 B2
(45) Date of Patent: Sep. 19, 2017

(54) CANISTER ARRANGEMENT STRUCTURE FOR SADDLE-RIDE TYPE VEHICLE

(71) Applicant: HONDA MOTOR CO., LTD., Tokyo (JP)

(72) Inventors: Katsuyuki Okubo, Wako (JP);
Masanori Nakamura, Wako (JP);
Masashi Nagayama, Wako (JP);
Tetsunori Iwamoto, Wako (JP);
Takasumi Yamanaka, Wako (JP);
Matake Sugeno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 652 days.

(21) Appl. No.: 13/798,509

(22) Filed: Mar. 13, 2013

(65) Prior Publication Data

US 2013/0247881 A1  Sep. 26, 2013

(30) Foreign Application Priority Data

Mar. 22, 2012  (JP) .................................. 2012-064845

(51) Int. Cl.
*F02M 25/08* (2006.01)
*F02M 25/06* (2016.01)
*B62J 37/00* (2006.01)

(52) U.S. Cl.
CPC .............. *F02M 25/06* (2013.01); *B62J 37/00* (2013.01); *F02M 25/089* (2013.01); *F02M 25/0854* (2013.01)

(58) Field of Classification Search
CPC ........... F02M 25/0854; F02M 25/0872; F02M 25/089; F02M 25/06–25/08; F02M 37/0076; B62K 2202/00; B62J 35/00; B62J 37/00

USPC .................. 123/519, 516, 520, 698; 180/229
See application file for complete search history.

(56) References Cited

U.S. PATENT DOCUMENTS

| 4,799,568 | A * | 1/1989 | Tanaka | B62J 17/02 180/219 |
|---|---|---|---|---|
| 7,438,058 | B2 * | 10/2008 | Ito | F02M 25/0872 123/518 |
| 7,810,842 | B2 * | 10/2010 | Ichikawa | F02M 25/0854 280/782 |
| 2008/0295641 | A1 * | 12/2008 | Suzuki | B62J 25/00 74/594.4 |
| 2010/0224172 | A1 * | 9/2010 | Kusa | B60K 15/03504 123/520 |
| 2010/0242925 | A1 * | 9/2010 | Yoshida | F02M 25/0854 123/519 |

(Continued)

FOREIGN PATENT DOCUMENTS

EP 2216239 A1 * 8/2010
JP 2003-246287 9/2003

*Primary Examiner* — Mahmoud Gimie
*Assistant Examiner* — Josh Campbell
(74) *Attorney, Agent, or Firm* — Rankin, Hill & Clark LLP (57) ABSTRACT

A canister arrangement structure for a saddle-ride type vehicle in which a canister for adsorbing evaporated fuel in a fuel tank is disposed below a step floor on which an occupant's foot is placed, the step floors are configured as a left and right pair and are supported from below by left and right step frames that extend back and forth at a position on the side of the main frame of the vehicle. The canister is supported by the one step frame.

14 Claims, 9 Drawing Sheets

(56) References Cited

U.S. PATENT DOCUMENTS

| | | | |
|---|---|---|---|
| 2010/0243353 A1* | 9/2010 | Inaoka | B60K 13/02 180/68.3 |
| 2011/0100742 A1* | 5/2011 | Shibata | B62J 35/00 180/219 |
| 2011/0120796 A1* | 5/2011 | Kuramochi | B62J 37/00 180/219 |

* cited by examiner

CANISTER ARRANGEMENT STRUCTURE FOR SADDLE-RIDE TYPE VEHICLE

BACKGROUND OF THE INVENTION

Field of the Invention

The present invention relates to a canister arrangement structure for a saddle-ride type vehicle having a canister disposed below a step floor.

Description of Related Art

A technology of securing a canister adsorbing evaporated fuel to a main frame via a stay at a position below a step floor as a foot rest has heretofore been known in scooter type and saddle-ride type vehicles (see Japanese Patent Laid-Open No. 2003-246287).

The canister is secured to the main frame; therefore, the conventional canister arrangement structure mentioned above needs the main frame in a step of assembling the canister, which leads to a problem with productivity.

SUMMARY OF THE INVENTION

The present invention has been made in view of the above circumstances and aims to provide a canister arrangement structure that can easily assemble a canister and has increased productivity.

To achieve the above object, the present invention is characterized in that in a canister arrangement structure for a saddle-ride type vehicle in which a canister for adsorbing evaporated fuel in a fuel tank is disposed below step floors on which feet of an occupant are placed, the step floors are installed as a left and right pair and are supported from below by left and right step frames extending in a back and forth direction at a position on the side of a main frame of the vehicle, and the canister is supported by the one step frame. Therefore, the canister can previously be assembled to the one step frame and along with the one step frame can be assembled to the vehicle body. Thus, the canister can easily be assembled, which leads to improved conductivity.

In the configuration described above, the canister may be disposed on the inside of the one step frame in a vehicle-width direction. In this case, since the canister is disposed on the inside of the one step frame in the vehicle-width direction; therefore, the canister can be protected by the one step frame.

The main frame may have a head pipe and down tubes, the down tubes being configured as a left and right pair, extending downward from the head pipe, then bending and extending rearward below the step frames, and the down tubes may be located below the canister as viewed from the side. In this case, the down tubes of the main frame are located below the canister as viewed from the side; therefore, the canister can be protected by the down tubes.

Further, a radiator for an engine of the vehicle may be installed in a front portion of the vehicle, a reservoir tank of the radiator may be installed behind the radiator, and the canister may be disposed behind the reservoir tank. In this case, the reservoir tank is installed behind the radiator and the canister is located behind the reservoir tank. Therefore, the thermal influence of the exhaust heat from the radiator on the canister can be reduced by the reservoir tank.

The canister and the fuel tank may overlap each other as viewed from the side. In this case, since the canister and the fuel tank overlap each other as viewed from the side; therefore, the pipe connecting the canister with the fuel tank can be shortened.

Further, the vehicle may have a unit swing type engine connected to a rear portion of the main frame, the fuel tank being supported by a front portion of the main frame, and the canister may be disposed between the fuel tank and the engine as viewed from the side. In this case, since the canister is disposed between the fuel tank and the engine as viewed from the side, the pipe connecting the canister with the fuel tank and the pipe connecting the canister with the engine side can be shortened.

The main frame may include seat rails configured as a left and right pair, the seat rails being disposed above the down tubes, having front ends connected to the corresponding down tubes and extending in a rearward and upward direction; and left and right upper tubes disposed above the down tubes and connecting a front portion of the main frame with the seat rails. The body cover of the vehicle may have a center tunnel portion, the center tunnel portion covering the left and right upper tubes from above and having a lower edge joined to the upper surfaces of the left and right step floors. A longitudinal wall portion of the center tunnel portion connected to the one step frame may overlap the canister as viewed from above. In this case, the body cover has the center tunnel portion covering the left and right upper tubes from above and having the lower edge connected to the upper surfaces of the left and right step floors. The longitudinal wall portion of the center tunnel portion joined to the one step frame overlaps the canister as viewed from above. An amount of deflection of the vicinity of the longitudinal wall portion encountered when an occupant puts her or his foot on the step floor is small. The canister can be disposed at an upper position so as to come as close to the step floor as possible. The lower portion of the canister can be increased in minimum ground height. Thus, the bank angle of the saddle-ride type vehicle can largely be ensured.

The canister and the seat rail may overlap each other as viewed from above. In this case, since the canister and the seat rail overlap each other as viewed from above, the canister is disposed on the inside in the vehicle-width direction, whereby the bank angle of the saddle-ride type vehicle can largely be ensured.

Further, the step frames may be disposed in a posterior-superior direction. The canister may be disposed such that an axis extends in the posterior-superior direction along the step frames. A pipe connecting the canister and the fuel tank may be connected to a rear portion of the canister. In this case, the step frames are disposed in a posterior-superior direction. The canister is disposed such that the axis extends in the posterior-superior direction along the step frames. The pipe connecting the canister with the fuel tank is connected to a rear portion of the canister. Thus, the evaporated fuel in the fuel tank can easily be supplied through the pipe to the rear portion of the canister disposed in the posterior-superior direction. The canister can be disposed in the posterior-superior direction by the use of the inclination of the step frame without the use of a dedicated stay or the like.

In the canister arrangement structure for a saddle-ride type vehicle according to the present invention, the step floors are supported from below by the left and right step frames extending back and forth at a position on the side of the main frame of the vehicle. The canister is supported by the one step frame. Therefore, the canister can previously be assembled to the one step frame and along with the one step frame can be assembled to the vehicle body. Thus, the canister can easily be assembled, which leads to improved productivity.

Additionally, the canister can be protected by the one step frame.

The down tubes of the main frame are located below the canister as viewed from the side; therefore, the canister can be protected by the down tubes.

Further, the canister is located behind the reservoir tank. Therefore, the thermal influence of the exhaust heat from the radiator on the canister can be reduced by the reservoir tank.

The canister and the fuel tank overlap each other as viewed from the side; therefore, the pipe connecting the canister with the fuel tank can be shortened.

Since the canister is disposed between the fuel tank and the engine as viewed from the side, the pipe connecting the canister with the fuel tank and the pipe connecting the canister with the engine side can be shortened.

The longitudinal wall portion of the center tunnel portion of the body cover overlaps the canister as viewed from above. An amount of deflection of the vicinity of the longitudinal wall portion encountered when an occupant puts her or his foot on the step floor is small. The canister can be disposed at an upper position so as to come as close to the step floor as possible. The lower portion of the canister can be increased in minimum ground height. Thus, the bank angle of the saddle-ride type vehicle can largely be ensured.

Further, the step frames are disposed in a posterior-superior direction. The canister is disposed such that the axis extends in the posterior-superior direction along the step frames. The pipe connecting the canister with the fuel tank is connected to a rear portion of the canister. Thus, the evaporated fuel in the fuel tank can easily be supplied through the pipe to the rear portion of the canister disposed in the posterior-superior direction. The canister can be disposed in the posterior-superior direction by the use of the inclination of the step frame without the use of a dedicated stay or the like.

DETAILED DESCRIPTION OF THE PREFERRED EMBODIMENTS

A motorcycle having a canister arrangement structure according to an embodiment of the present invention will hereinafter be described with reference to the drawings. Incidentally, the mentions of directions such as front and back or rear, left and right, and upside and downside in the description are the same as those with respect to a vehicle body unless otherwise described. In the figures, symbol FR denotes the front of the vehicle body, UP denotes the upside of the vehicle body and LE denotes the left of the vehicle body.

Figure 1:
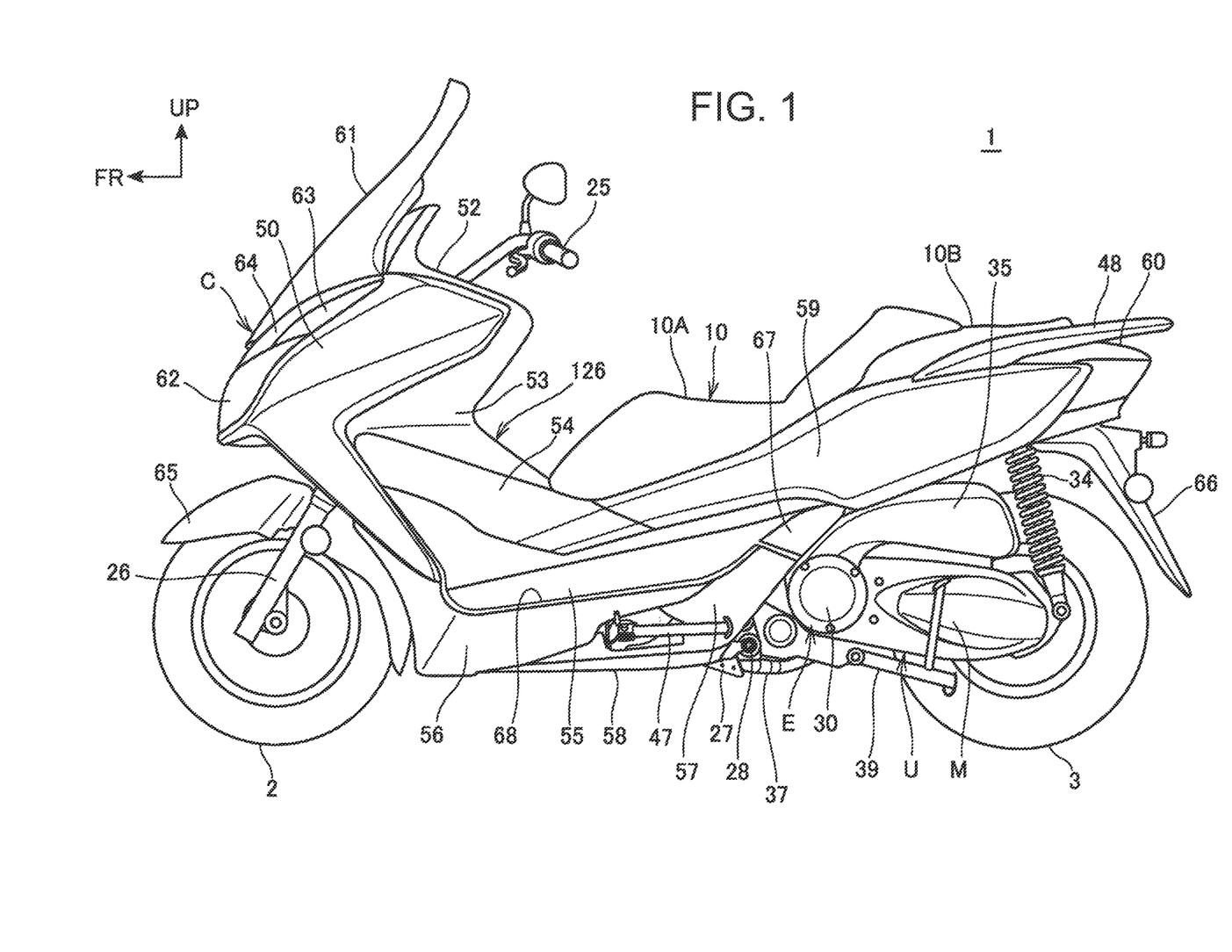
FIG. 1 is a left lateral view of a motorcycle according to an embodiment of the present invention.

FIG. 1 is a left lateral view of a motorcycle according to an embodiment of the present invention.

Figure 2:
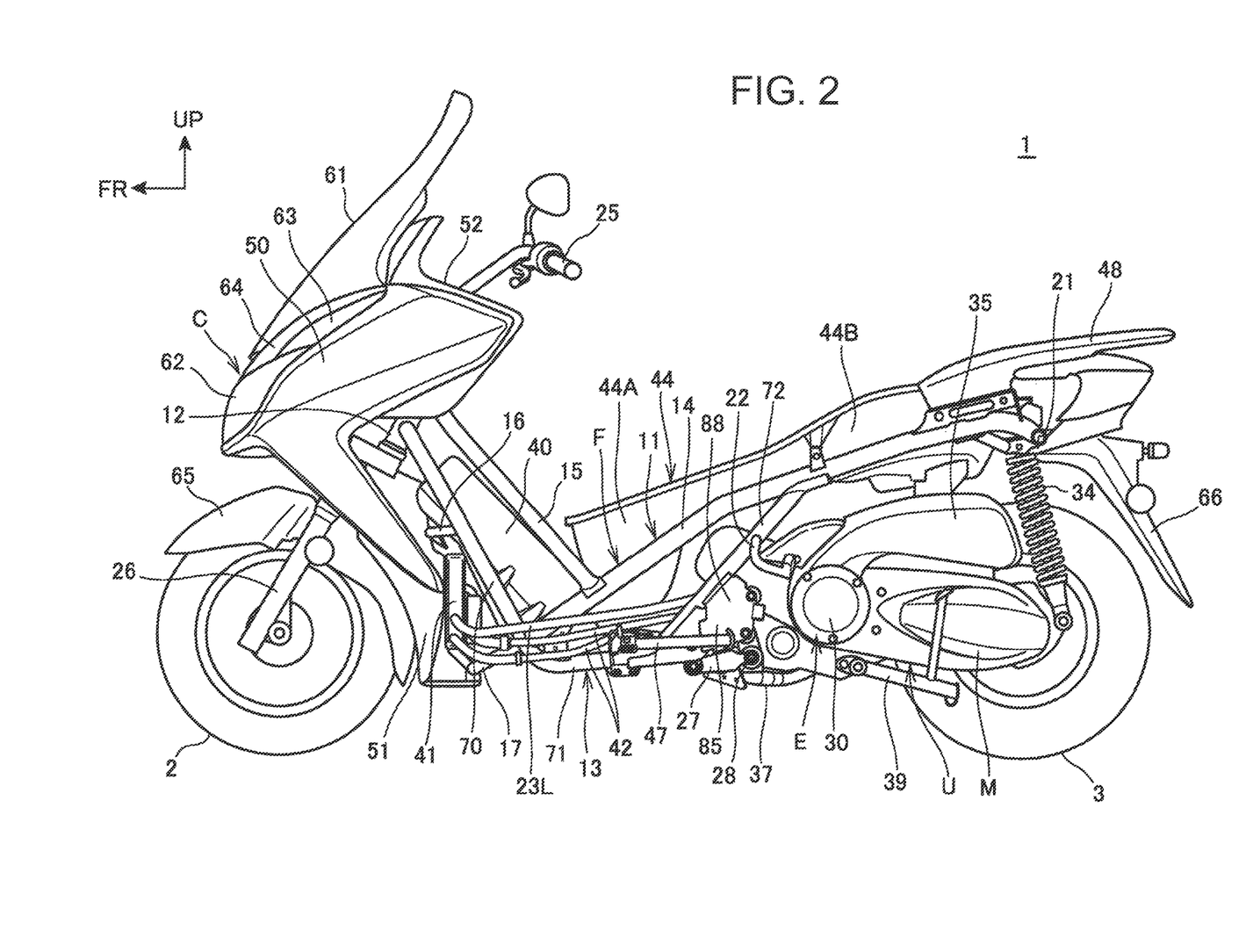
FIG. 2 is a left lateral view of an internal structure of a motorcycle.

A motorcycle 1 (a saddle-ride type vehicle) is a scooter-type vehicle having low step floors 68 on which feet of an occupant sitting on a seat 10 are placed. The motorcycle 1 has a front wheel 2 in front of a body frame F (FIG. 2). A rear wheel 3, which is a drive wheel, is rotatably supported by a unit swing engine U (a unit swing power unit) disposed in the rear portion of the vehicle. The body frame F is covered by a body cover C made of resin.

Figure 3:
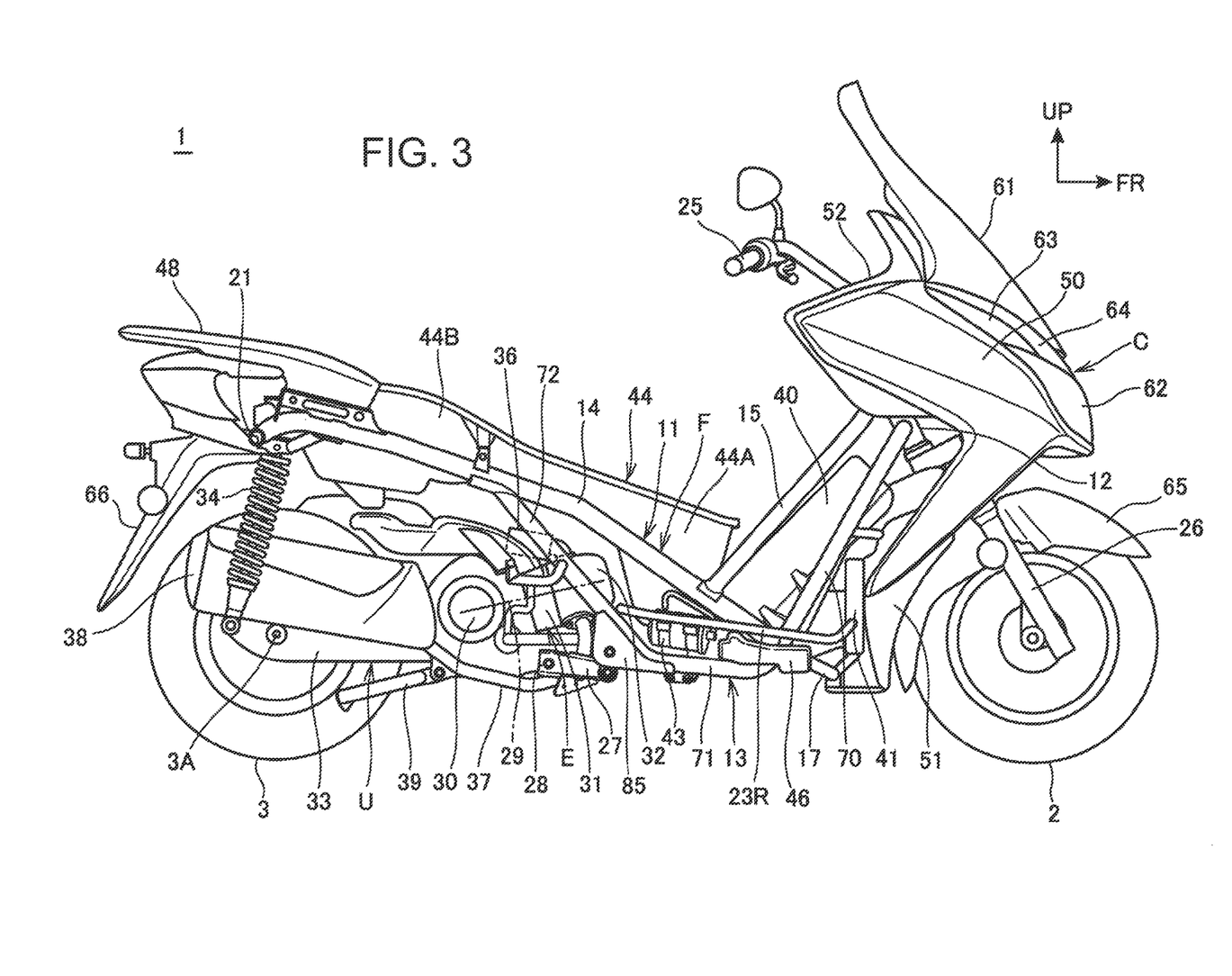
FIG. 3 is a right lateral view of the internal structure of the motorcycle.
Figure 4:
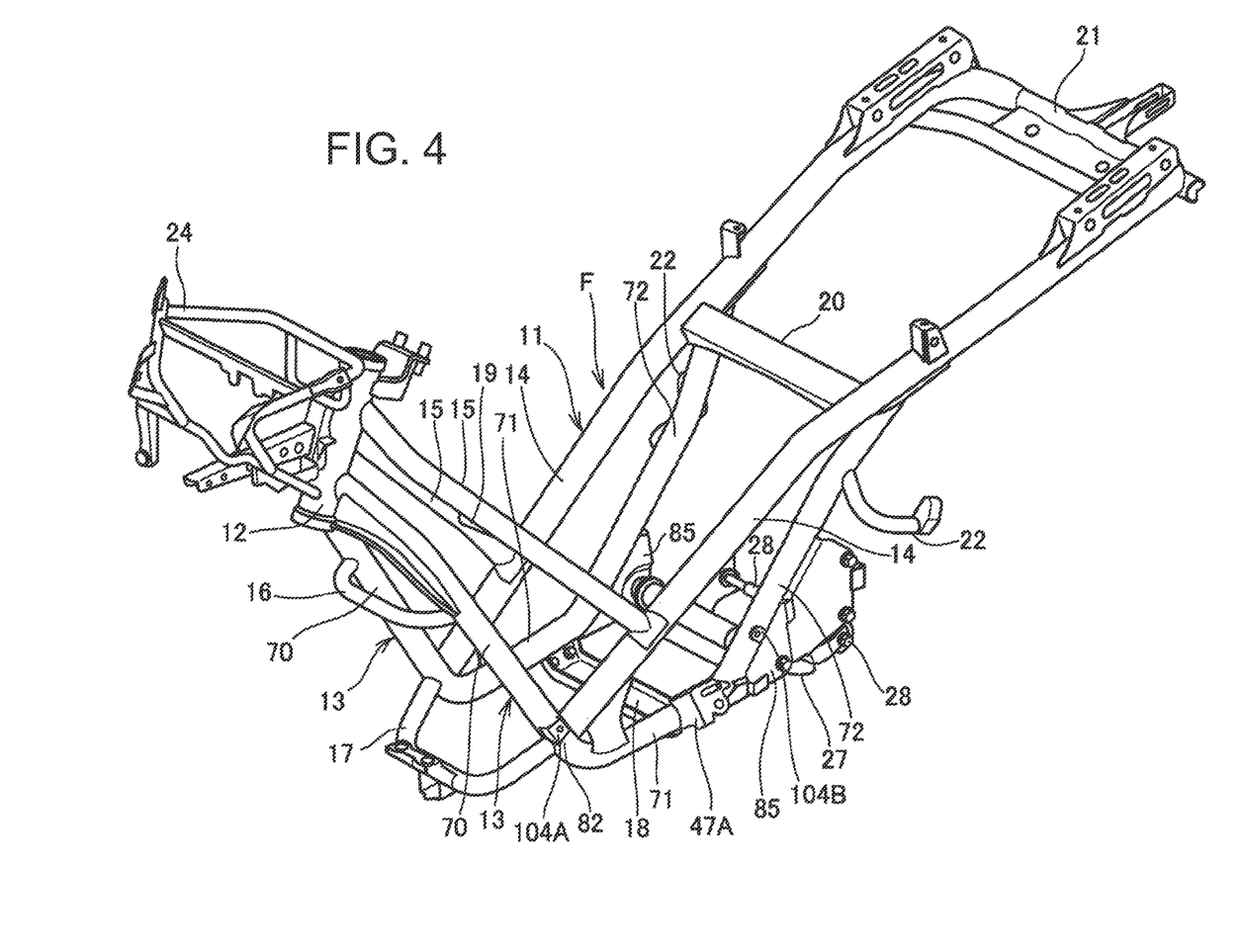
FIG. 4 is a perspective view of a body frame.

FIG. 2 is a left lateral view of an internal structure of the motorcycle 1. FIG. 3 is a right lateral view of the internal structure of the motorcycle 1. FIG. 4 is a perspective view of the body frame F. Incidentally, FIGS. 2 and 3 show a state where the body cover C is partially removed.

As shown in FIGS. 2 to 4, the body frame F is formed by connecting a plurality of metallic tubes or pipes by welding. A main frame 11 includes a head pipe 12 installed in a front portion; left and right down tubes 13, 13 extending rearward and downward from the head pipe 12, then extending generally horizontally rearward, and extending rearward and upward in a rear portion; left and right seat rails 14, 14 extending rearward and upward from the corresponding lower portions of the down tubes 13, 13 to the rear portion of the vehicle; and left and right upper tubes 15, 15 extending rearward and downward from the head pipe 12 at a position above the down tubes 13, 13 and coupled to corresponding seat rails 14, 14.

Each of the down tubes 13, 13 includes a downward extending portion 70 having a front end joined to the head pipe 12 and extending rearward and downward; a horizontally extending portion 71 extending rearward and generally horizontally from the lower end of the downward extending portion 70; and an obliquely upward extending portion 72 extending rearward and upward from the rear end of the horizontally extending portion 71.

As shown in FIG. 4, the main frame 11 includes a front upper cross member 16 connecting upper portions of downward extending portions 70, 70 of the down tubes 13, 13; a front cross member 17 connecting lower portions of the downward extending portions 70, 70; and a horizontal cross member 18 connecting the horizontally extending portions 71, 71 of the down tubes 13, 13. Further, the main frame 11 includes an upper cross member 19 connecting the upper tubes 15, 15; an intermediate cross member 20 connecting the seat rails 14, 14; and a rear cross member 21 connecting rear portions of the seat rails 14, 14. The front upper cross member 16, the front cross member 17, the horizontal cross member 18, the upper cross member 19, the intermediate cross member 20 and the rear cross member 21 serve as cross members connecting the left and right frames. The horizontal cross member 18 is bolted to the horizontally extending portions 71, 71.

Left and right tandem step stays 22, 22 extending outwardly in a vehicle-width direction are installed at upper portions of obliquely upward extending portions 72, 72 of the down tubes 13, 13.

A basket-like front frame 24 supporting lights, the body cover C and the like is connected to the front surface of the head pipe 12.

Left and right step frames 23L, 23R (FIGS. 2 and 3) connected to the respective down tubes 13, 13, extending back and forth and supporting step floors 68 from below are installed on the externally sides of the main frame 11.

As shown in FIGS. 1 to 3, a steering system for steering the front wheel 2 has a steering shaft (not shown) turnably supported by the head pipe 12 and a handlebar 25 connected to the upper portion of the steering shaft. The steering shaft has a lower end connected to left and right front forks 26, 26. The front wheel 2 is pivotally supported by the lower ends of the front forks 26, 26 and is steered by the operation of the handlebar 25.

The unit swing engine U is of a unit swing type in which an engine E and a transmission case M housing a belt type continuously variable engine (not shown) are integrated. In addition, the unit swing engine U has a function as a swing arm supporting the rear wheel 3. The unit swing engine U is connected to rear portions of the down tubes 13, 13 via corresponding link members 27 connected to a front portion thereof. In addition, the unit swing engine U is vertically swingable around a pivot shaft 28 installed on the link member 27. Left and right power unit support portions 85, 85 supporting the unit swing engine U via the link members 27 are formed on the rear surfaces of the obliquely upward extending portions 72.

The engine E is a water-cooled four-cycle single-cylinder engine and is disposed such that a cylinder axis 29 extends forward and roughly horizontally. The engine E is configured such that a cylinder 31 and a cylinder head 32 joined to each other are located on the front surface of a crankcase 30 disposed in the front portion of the unit swing engine U.

The transmission case M extends from the rear portion of the crankcase 30 and passes on the left side of the rear wheel 3 toward the rearward. An arm portion 33 (FIG. 3) passing the right side of the rear wheel 3 and extending toward the rearward is installed in the rear portion of the crankcase 30. The rear wheel 3 is supported by an axle 3A installed between the rear portion of the transmission case M and the rear portion of the arm portion 33. The power of the engine E is transmitted to the rear wheel 3 via the above-mentioned continuously variable transmission.

Left and right rear suspensions 34, 34 spans between the rear end of the transmission case M and the seat rail 14 and between the rear end of the arm portion 33 and the seat rail 14.

An air clear box 35 adapted to suck outside air is installed on the upper surface of the transmission case M. The air cleaner box 35 is connected via a connecting tube (not shown) to a throttle body 36 coupled to an intake port located on an upper surface of the cylinder head 32.

An exhaust pipe 37 connected to an exhaust port located on a lower surface of the cylinder head 32 passes below the engine E, extends rearward and is coupled to a muffler 38 secured to an external side surface of the arm portion 33.

A main stand 39 capable of supporting the vehicle in an upright state is installed below the rear portion of the transmission case M.

A fuel tank 40 for storing fuel for the engine E is formed to have a front surface extending along the downward extending portion 70 of the down tube 13 and a rear surface extending along the upper tube 15. As to the vertical direction, the fuel tank 40 vertically lengthwise extends from the back of the lower portion of the head pipe 12 to the vicinity of the horizontally extending portion 71 of the down tube 13. The fuel tank 40 is disposed between the left and right down tubes 13, 13 so as to be tilted forward.

A plate-like radiator 41 for cooling the cooling water of the engine E is installed in space below the front portion of the forward tilted fuel tank 40. A pair of cooling water pipes 42 connecting the radiator 41 with the engine E extends from the left side portion of the radiator 41, then extends below the step frame 23L (FIG. 2) on the left (one side) of the vehicle, passes inside the down tube 13 and is connected to the engine E.

A side stand 47 is attached to the left horizontally extending portion 71.

A reservoir tank 46 for storing a portion of cooling water of the radiator 41 is disposed below the step frame 23R (one of the step frames) (FIG. 3) on the right side (the other side) of the vehicle at a position behind the radiator 41. A canister 43 adapted to adsorb evaporated fuel in the fuel tank 40 is located below the step frame 23R at a position behind the reservoir tank 46.

A storage box 44 for storing articles is disposed between the seat rails 14, 14. The storage box 44 extends from the vicinity of the rear portion of the fuel tank 40 to above the transmission case M along the seat rails 14, 14 in a posterior-superior direction. The storage box 44 is integrally formed of a front storage portion 44A and a rear storage portion 44B by resin molding. The front storage portion 44A is disposed between the fuel tank 40 and the obliquely upward extending portion 72 of the down tube 13. The rear storage portion 44B is disposed above the unit swing engine U.

The upper surface of the storage box 44 is opened over the entire length thereof. This opening is closed by the occupant seat 10 (FIG. 1) in an openable and closable manner. The seat 10 has a front seat 10A on which a rider sits and a rear seat 10B which is formed a little higher than the front seat 10A and on which a pillion passenger sits.

A grab rail 48 is secured to the rear portions of the seat rails 14, 14 at a position behind the storage box 44.

As shown in FIG. 1, the body cover C includes a front cover 50, a front lower cover 51 (FIGS. 2 and 3), an upper cover 52, an upper inner cover 53, left and right lower inner covers 54, 54, left and right step covers 55, 55, left and right front floor skirts 56, 56, left and right rear floor skirts 57, 57, an under cover 58, left and right body side covers 59, 59, and a tail cover 60. The front cover 50 covers the front and left and right sides of the head pipe 12 and extends below the front of the downward extending portion 70. The front lower cover 51 is joined to the lower portion of the front cover 50 and located behind the front wheel 2. The upper cover 52 is joined to the upper portion of the front cover 50 at a position below the handlebar 25. The upper inner cover 53 is joined to the left and right edge portions of the front cover 50 and covers the head pipe 12, the upper tubes 15, 15 and the downward extending portion 70 from the rearward and sides. The lower inner covers 54, 54 are joined to the lower edge of the upper inner cover 53 and cover the upper tubes 15, 15 and the downward extending portion 70. The step covers 55, 55 are joined to the lower portion of the front cover 50 and the lower edges of the lower inner covers 54, 54 and cover the step frames 23L, 23R from above. The front floor skirts 56, 56 are joined to the lower portion of the front cover 50 and the lower portions of the step covers 55, 55 and cover the step frames 23L, 23R from the sides. The rear floor skirts 57, 57 are continuous with the front floor skirts 56, 56, extend rearward and cover the down tubes 13, 13. The under cover 58 covers the left and right horizontally extending portions 71, 71 from below. The body side covers 59, 59 are joined to the rear portions of the lower inner covers 54, 54 and of the step covers 55, 55 and cover the storage box 44 and the seat rails 14, 14 from the sides at a position below the seat 10. The tail cover 60 is joined to the rear portions of the body side covers 59, 59.

The step floors 68, which receive the feet of a rider sitting on the front seat 10A, are formed on the bottoms of the left and right step covers 55, 55.

A windshield 61 extending in a posterior-superior direction is installed in the front portion of the front cover 50. A headlight 62 is installed at the front end of the front cover 50.

Left and right turn signals 63 are installed to be continuous with the upper portion of the headlight 62. A plate-like garnish 64 is installed between the headlight 62 and the windshield 61.

A front fender 65 covering the front wheel 2 from above is installed on the front forks 26, 26. A rear fender 66 covering the rear wheel 3 from above is installed below the body side covers 59, 59.

Foldable tandem steps 67 (FIG. 1), which receive the feet of a pillion passenger sitting on the rear seat 10B, are supported by the tandem step stays 22, 22.

Figure 5:
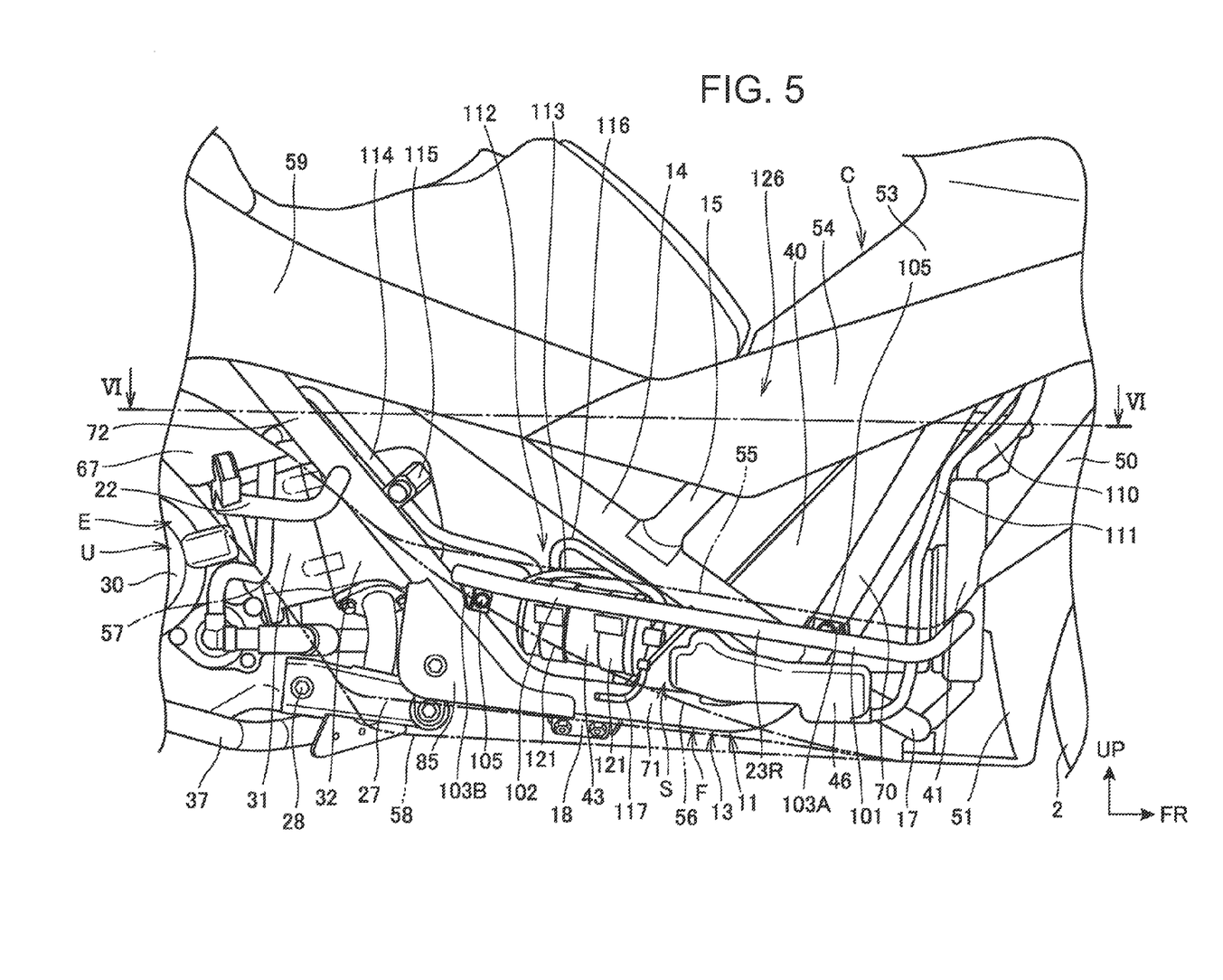
FIG. 5 is a right lateral view showing an anteroposteriorly intermediate portion of the motorcycle.
Figure 6:
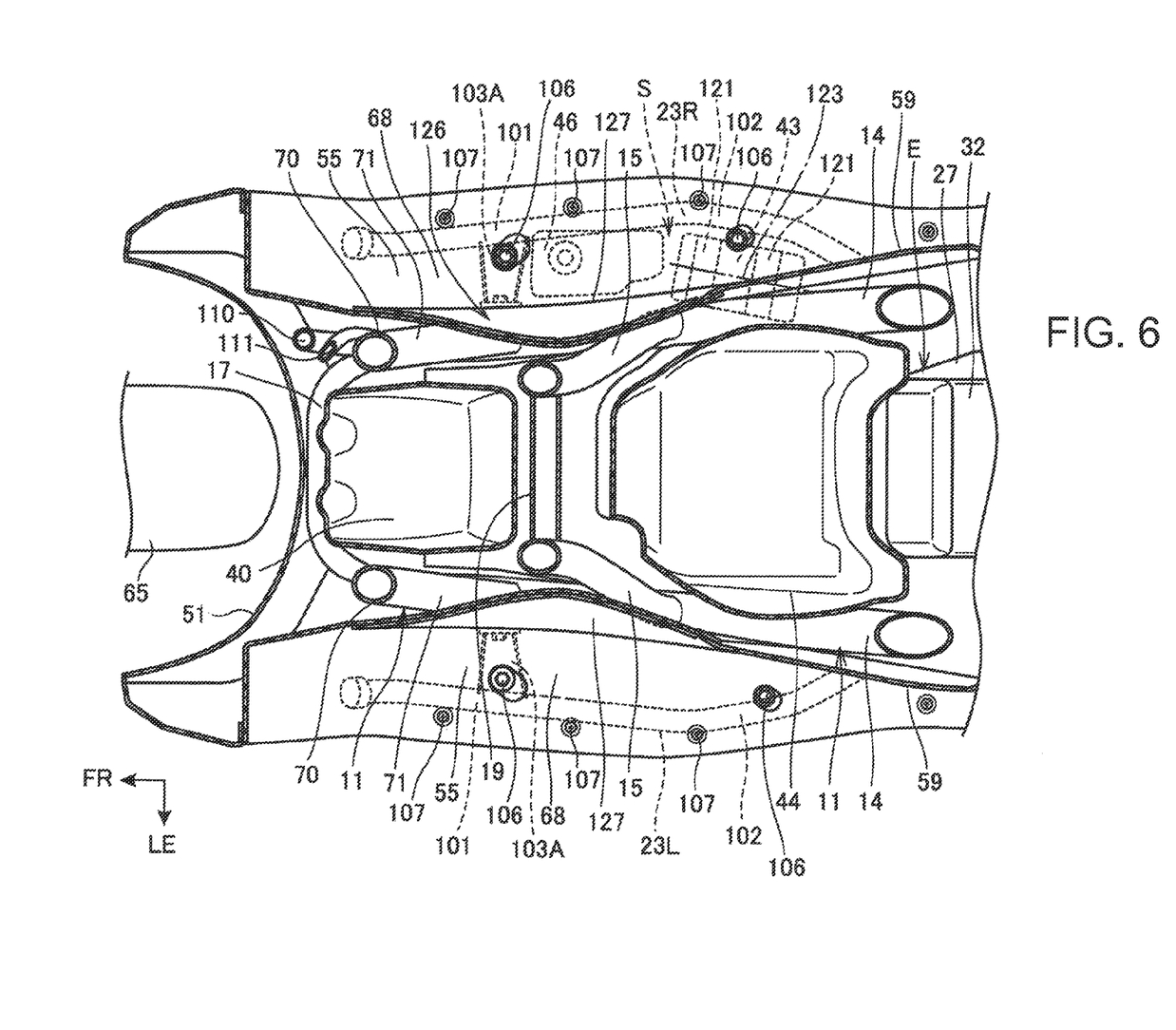
FIG. 6 is a cross-sectional view taken along line VI-VI in FIG. 5.
Figure 7:
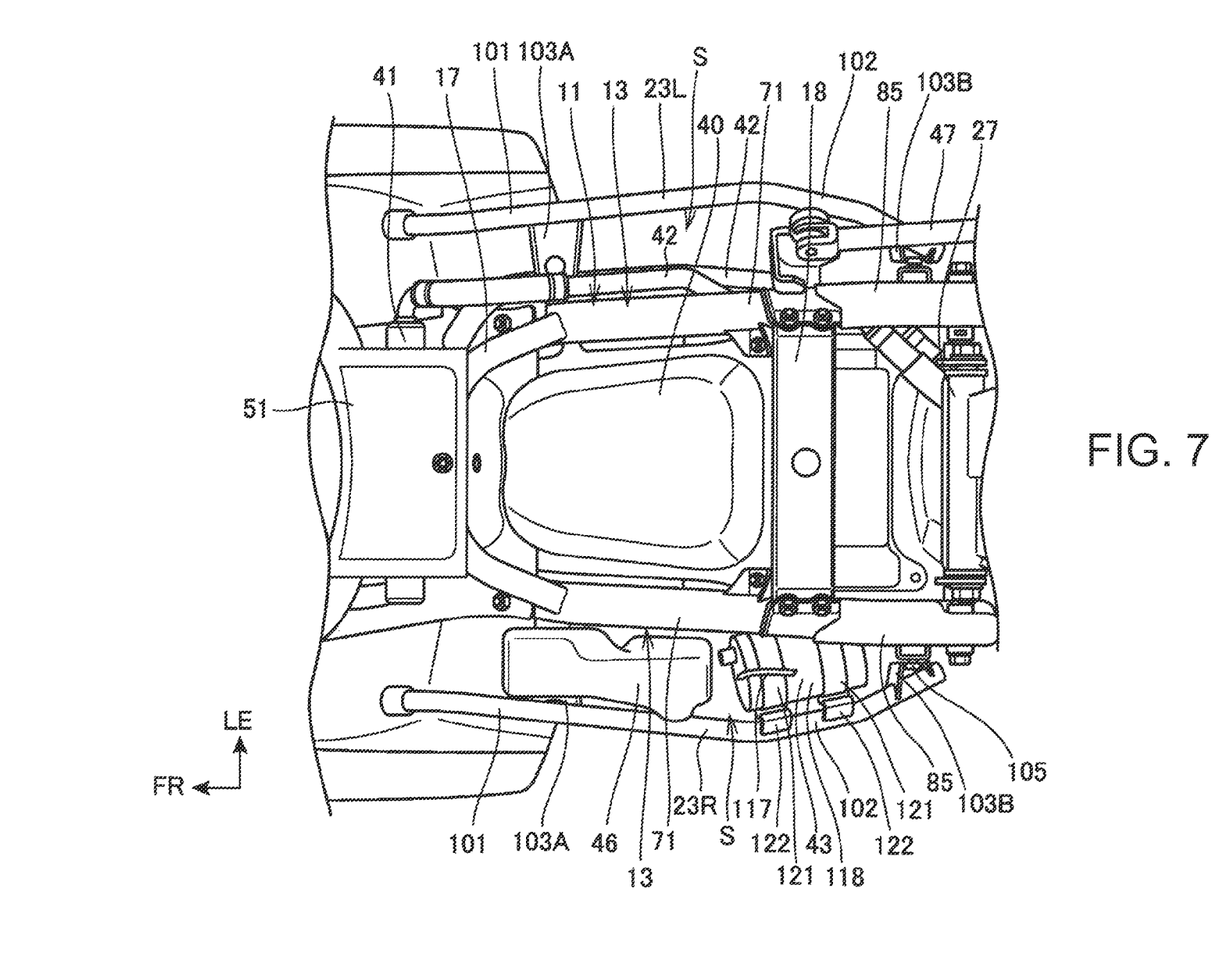
FIG. 7 shows the anteroposteriorly intermediate portion of the motorcycle as viewed from below.

FIG. 5 is a right lateral view showing an anteroposteriorly intermediate portion of the motorcycle 1. FIG. 6 is a cross-sectional view taken along VI-VI in FIG. 5. FIG. 7 shows the intermediate portion of the motorcycle 1 in the anteroposterior direction from below. Incidentally, a portion of the body cover C is denoted by a two-dot chain line in FIG. 5. In FIG. 7, the body cover C covering the anteroposteriorly intermediate portion of the motorcycle 1 is removed.

As shown in FIGS. 5 to 7, the step frames 23L, 23R are tubular frames extending back and forth at a position vehicle-widthwise outwardly away from the main frame 11 and above the horizontally extending portions 71 of the down tubes 13, 13. In addition, the step frames 23L, 23R are arranged in a posterior-superior direction. The step frames 23L, 23R have front ends located on the side of the radiator 41 and rear ends located on the side of the obliquely upward extending portion 72.

As shown in FIG. 7, the step frames 23L, 23R have step frame front portions 101 and step frame rear portions 102. The step frame front portions 101 extend rearward while broadening vehicle-widthwise so as to be nearly parallel to the corresponding horizontally extending portions 71 of the down tubes 13, 13. While narrowing vehicle-widthwise, the step frame rear portions 102 extend rearward and come close to the corresponding obliquely upward extending portions 72.

Each of the step frames 23L, 23R has, at its front portion and rear portion, a front stay 103A and a rear stay 103B, respectively, which project toward the down tubes 13, 13, i.e., toward the vehicle-widthwise inside.

Securing portions 104A and 104B (FIG. 4) are installed on an outside surface of a lower portion of the downward extending portion 70 and of the obliquely upward extending portion 72, respectively, in each of the down tubes 13, 13. The securing portions 104A and 104B are joined to the front stay 103A and the rear stray 103B, respectively, of each of the step frames 23L, 23R. Specifically, the securing portion 104A is installed close to a front connecting portion 82 where the front end of each of the seat rails 14, 14 is joined to the downward extending portion 70, and above the front connecting portion 82. The step frames 23L, 23R are each fastened to the securing portions 104A, 104B by securing bolts 105, 105 inserted into the front stay 103A and the rear stay 103B.

The step frames 23L, 23R are located away from the main frame 11 in a vehicle-width direction. Therefore, spaces S, S where components or the like are arranged are defined between the main frame 11 and the left and right step frames 23L, 23R. The spaces S, S are covered from above by the step floors 68 of the step covers 55, 55 and also from the side by the front floor skirts 56, 56 and the rear floor skirts 57, 57.

A pair of cooling water pipes 42, 42 (FIG. 7) extending back and forth is arranged in the left space S. The reservoir tank 46 and the canister 43 are disposed in the right space S.

The step frames 23L, 23R are each such that the front stay 103A and the step frame rear portion 102 have respective securing holes (not shown). The step floors 68, 68 are each screwed to the securing holes by means of bolts 106, 106 inserted therethrough from above. The step floors 68, 68 are joined to the front floor skirts 56, 56 and the rear floor skirts 57, 57 by a plurality of screws 107 provided on the upper surfaces of the outer edge portions.

As shown in FIG. 5, the radiator 41 is located in front of the spaces S, S. A water filling pipe 110 is installed on the upper portion of the radiator 41. A cooling water pouring port (not shown) is coupled to the upper end of the water filling pipe 110. A reservoir pipe 111 through which cooling water flows is coupled to the pouring port. The reservoir pipe 111 extending downward has a lower end coupled to the front portion of the reservoir tank 46. The reservoir tank 46 is an anteroposteriorly long tank and is located at a front portion in the right space S. The reservoir tank 46 overlaps the down tube 13 and the lower portion of the fuel tank 40 as viewed from the side.

A detailed description is hereinafter given of an arrangement structure for the canister 43.

Figure 8:
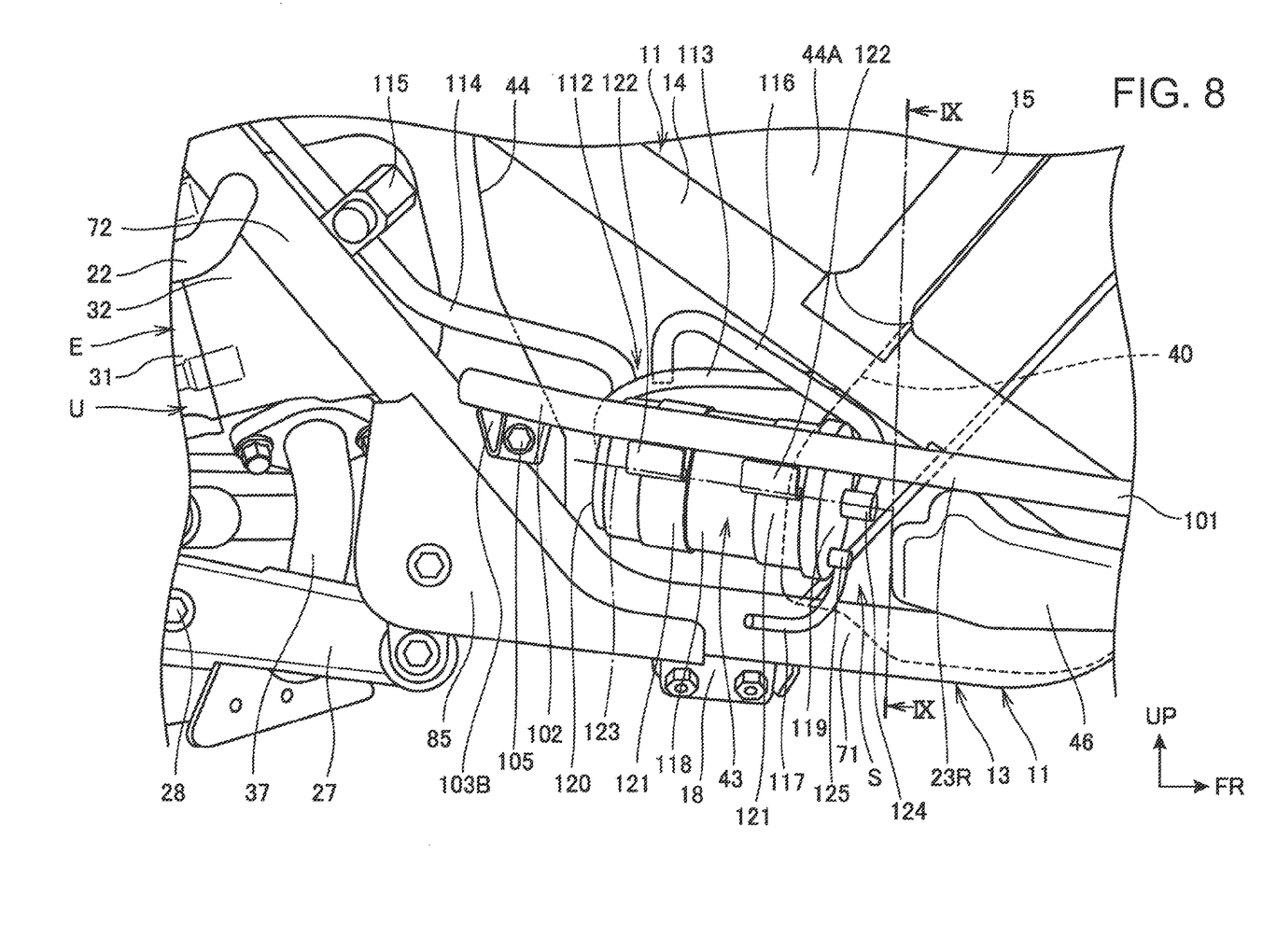
FIG. 8 is an enlarged view of the vicinity of a canister.
Figure 9:
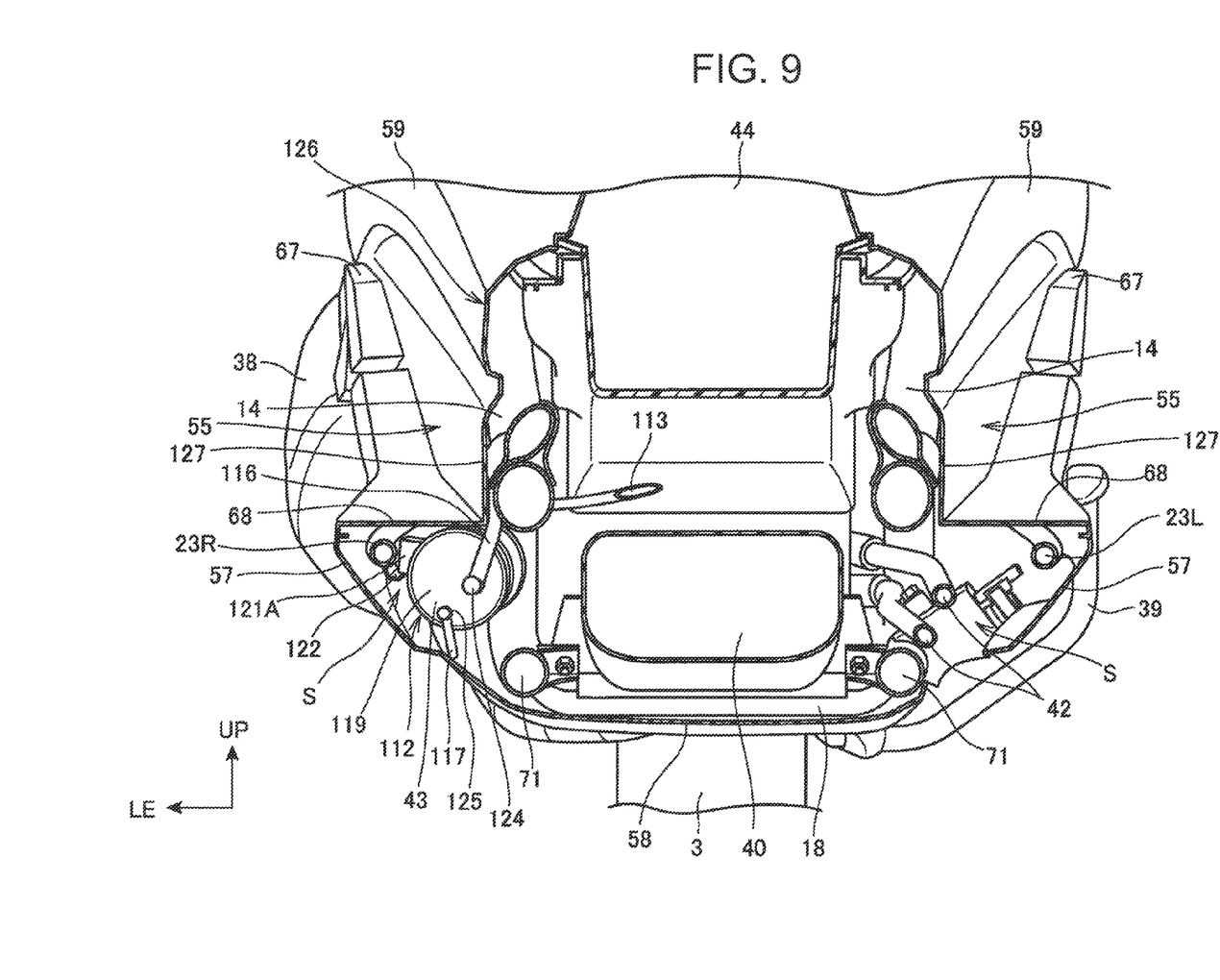
FIG. 9 is a cross-sectional view taken along line IX-IX in FIG. 8.

FIG. 8 is an enlarged view of the vicinity of the canister 43. FIG. 9 is a cross-sectional view taken along line IX-IX in FIG. 8. Incidentally, FIG. 9 shows the body cover C.

The canister 43 is a main component of evaporated fuel treatment equipment 112 that temporarily stores the evaporated fuel in the fuel tank 40 and supplies it to the engine E for burning. The evaporated fuel treatment equipment 112 is a system in which HC (hydrocarbon), which is a component of the evaporated fuel in the fuel tank 40, is temporarily adsorbed by the tubular canister 43. In addition, the evaporated fuel thus adsorbed is supplied to the intake system of the engine E by the use of the negative pressure of the intake air of the engine E and is burned together with an air-fuel mixture. This system can prevent the evaporated fuel from diffusing toward the outside.

As shown FIGS. 8 and 9, the evaporated fuel treatment equipment 112 includes the canister 43 adapted to allow evaporated fuel to be stored in an adsorbent such as activated charcoal or the like installed therein; a charge pipe 113 connecting the fuel tank 40 with the canister 43; and a purge pipe 114 connecting an intake pipe (not shown) with the canister 43, the intake pipe connecting the throttle body 36 with the intake port of the engine E. The evaporated fuel treatment equipment 112 further includes a purge control valve 115 installed in the middle of the purge pipe 114; an atmosphere open pipe 116 adapted to allow the canister 43 to communicate with the outside; and a drain pipe 117 adapted to discharge water and fuel having become liquid in the canister 43.

The purge control valve 115 is a one-way valve that controls timing when to supply evaporated fuel toward the engine E and is controllably opened and closed by a controller (not shown) mounted on the vehicle.

The canister 43 includes a cylindrical body portion 118, a front lid portion 119 closing one end of the body portion 118, and a rear wall portion 120 closing the other end of the body portion 118.

A pair of securing bands 121, 121 made of rubber is wound around the front and rear portions of the body portion 118 of the canister 43. The canister 43 is secured to the right step frame 23R via the securing bands 121, 121. The securing bands 121, 121 have a pair of retaining portions 121A, 121A (FIG. 9) projecting toward the radial outside of the canister 43.

A pair of stays 122, 122 formed with hook-like ends is installed on the under surface of the step frame rear portion 102 of the step frame 23R. The canister 43 is secured to the step frame rear portion 102 by fitting from above retaining holes to the stays 122, 122, the retaining holes being provided in the respective retaining portions 121A, 121A of the securing bands 121, 121.

The canister 43 is secured to the step frame 23R disposed in a posterior-superior direction so that its axis 123 may be tilted in the posterior-superior direction.

As shown in FIGS. 6 to 9, the canister 43 is disposed in the rear portion of the space S at a position inside the step frame 23R in the vehicle-width direction. As to the vertical direction, the canister 43 is located between the seat rail 14 and the horizontally extending portion 71. In addition, the position of the upper surface of the canister 43 roughly corresponds to that of the upper portion of the step frame 23R. The seat rail 14 extends in the posterior-superior direction in the rear portion of the space S. Therefore, a relatively large space is ensured between the seat rail 14 and the horizontally extending portion 71. The canister 43 is disposed such that its rear portion enters this space. In other words, the canister 43 is disposed such that the axis 123 broadens in the vehicle-width direction as it goes forward as shown in FIG. 6. The inside portion of the rear portion of the canister 43 overlaps the seat rail 14 as viewed from above. As described above, the canister 43 is disposed on the inside in the vehicle-width direction so as to overlap the seat rail 14 as viewed from above. Thus, when the motorcycle 1 is banked, the canister 43 does not lie in the way, so that a bank angle can be ensured.

The canister 43 is located inside the step frame 23R and above the horizontally extending portion 71; therefore, the canister 43 can be protected by the step frame 23R and the horizontally extending portion 71.

The canister 43 is disposed adjacently to the rear portion of the reservoir tank 46 at a position behind the reservoir tank 46. Because of the existence of the reservoir tank 46, exhaust heat from the radiator 41 can be prevented from reaching the canister 43. Thus, it is possible to prevent the exhaust heat of the radiator 41 from influencing the canister 43.

The canister 43 is disposed such that the front lid portion 119 faces the front of the vehicle. The front lid portion 119 includes an open pipe connecting portion 124 to which one end of the atmosphere open pipe 116 is coupled; and a drain pipe connecting portion 125 which is installed in a lower portion of the front lid portion 119 and to which one end of the drain pipe 117 is coupled.

The atmosphere open pipe 116 bends rearward and upward from the open pipe connecting portion 124 and then bends downward. In addition, the atmosphere open pipe 116 has the other end opening downward at a position above the body portion 118. As described above, since the atmosphere open pipe 116 has the other end extending upward and opening downward, it is possible to prevent water or foreign matter from entering the canister 43 from the other end of the atmosphere open pipe 116.

The drain pipe 117 extends rearward and downward from the drain pipe connecting portion 125 and opens rearward at a position below the body portion 118. The drain pipe connecting portion 125 is installed in the lower portion of the front lid portion 119 and the drain pipe 117 extends downward. Thus, it is possible to smoothly discharge water or the like from the canister 43.

The charge pipe 113 and the purge pipe 114 are connected at their one ends to the rear wall portion 120 of the canister 43. The charge pipe 113 extends from the rear wall portion 120, passes above the body portion 118 and extends toward the front, i.e., toward the fuel tank 40. The charge pipe 113 is coupled at the other end thereof to an evaporated fuel discharge port (not shown) of the upper portion of the fuel tank 40.

The purge pipe 114 extends from the rear wall portion 120 along the obliquely upward extending portion 72 toward the engine E and is coupled to the intake pipe mentioned above.

As described above, the charge pipe 113 and the purge pipe 114 are connected to the rear wall portion 120 of the canister 43 arranged to have the upward sloping rear portion. Therefore, evaporated fuel can smoothly be supplied to the canister 43 via the charge pipe 113. In addition, the evaporated fuel collecting at a higher position in the rear portion of the canister 43 can smoothly be supplied to the engine E via the purge pipe 114.

The canister 43 is disposed such that its front portion overlaps the rear portion of the fuel tank 40 as viewed from the side as shown in FIG. 8. Since the canister 43 is disposed near the fuel tank 40 as described above, the charge pipe 113 can be shortened. The rear portion of the canister 43 overlaps the bottom of the front storage portion 44A as viewed from the side.

The front end of the engine E overlaps the rear end of the step frame 23R as viewed from the side. The canister 43 is located in front of the engine E and in the rear of the fuel tank 40. Therefore, the canister 43 comes close to both the engine E and the fuel tank 40, thereby shortening the purge pipe 114 and the charge pipe 113.

As shown in FIGS. 5, 6 and 9, the body cover C has a center tunnel portion 126 protruding upward at a position between both the feet of a rider sitting on the seat 10. The rider puts her or his feet on the step floors 68, 68 installed on the right and left of the center tunnel portion 126.

The center tunnel portion 126 is formed such that the lower portion of the upper inner cover 53, the lower inner covers 54, 54 and the step covers 55, 55 cover the upper tubes 15, 15 and the front portions of the seat rails 14, 14 from above and the sides.

As shown in FIG. 9, the step covers 55, 55 have the step floors 68 and longitudinal wall portions 127. Each of the longitudinal wall portions 127 extends upward from a vehicle-widthwise inside edge portion of the step floor 68 and is joined to a lower edge portion of the lower inner cover 54 and of the body side cover 59. As shown in FIGS. 6 and 9, the longitudinal wall portion 127 of the center tunnel portion 126 overlaps the canister 43 as viewed from the above. A place on which a rider puts her or his feet is the step floors 68. An amount of vertical deflection near the longitudinal wall portion 127 encountered when a load resulting from the foot acts on the step floor 68 is small. The longitudinal wall portion 127 can be prevented from coming into contact with the canister 43. The canister 43 can be disposed on the upper side so as to come close to the lower surface of the step floor 68 as much as possible. The lower portion of the canister 43 can be increased in minimum ground height. Thus, the bank angle of the vehicle can largely be ensured.

A description is next given of an assembly procedure for the canister 43.

First, the canister 43 is previously assembled to the step frame 23R by fitting the securing bands 121, 121 wound around the body portion 118 to the corresponding stays 122, 122 of the step frame 23R.

Next, the step frame 23R to which the canister 43 is assembled is secured to the securing portions 104A, 104B of the down tube 13 by the securing bolts 105, 105 on a production line on which the main frame 11 flows. In this way, the canister 43, along with the step frame 23R, is assembled to the main frame 11. As described above, the canister 43 can previously be assembled with the main frame 11 being absent. Thus, productivity is improved. The process for assembling the canister 43 as a single body to the main frame 11 is omitted on the production line on which the main frame 11 flows. Thus, the productivity of the production line on which the main frame 11 flows can be improved.

As described above, according to the embodiment of the present invention, the step floors 68, 68, on which the feet of an occupant are placed, are installed as a left and right pair and are supported by the left and right step frames 23L, 23R extending back and forth at a position on the side of the main frame 11 of the vehicle. The canister 43 is supported by the one step frame 23R. Therefore, the canister 43 can previously be assembled to the one step frame 23R and the canister 43, along with the one step frame 23R, can be assembled to the main frame 11. Thus, the canister 43 can easily be assembled, which leads to improved productivity.

The canister 43 is disposed on the inside of the one step frame 23R in the vehicle-width direction. Therefore, the canister 43 can be protected by the one step frame 23R.

The horizontally extending portion 71 of the down tube 13 of the main frame 11 is located below the canister 43 as viewed from the side. Therefore, the canister 43 can be protected by the horizontally extending portion 71.

Further, the reservoir tank 46 is installed behind the radiator 41 and the canister 43 is disposed behind the reservoir tank 46. Therefore, the thermal influence of the exhaust heat from the radiator 41 on the canister 43 can be reduced by the reservoir tank 46.

The canister 43 and the fuel tank 40 overlap each other as viewed from the side; therefore, the charge pipe 113 connecting the canister 43 with the fuel tank 40 can be shortened.

Further, the canister 43 is disposed between the fuel tank 40 and the engine E as viewed from the side. Therefore, the charge pipe 113 connecting the canister 43 with the fuel tank 40 and the purge pipe 114 connecting the canister 43 with the engine E side can be shortened.

The body cover C has the center tunnel portion 126 that covers the left and right upper tubes 15, 15 from above and is joined at their lower edges to the upper surfaces of the left and right step floors 68, 68. The longitudinal wall portion 127 of the center tunnel portion 126 joined to the right step floor 68 overlaps the canister 43 as viewed from above. An amount of vertical deflection of the vicinity of the longitudinal wall portion 127 encountered when an occupant puts her or his foot on the step floor 68 is small. The canister 43 can be disposed at an upper position so as to come as close to the step floor 68 as possible. The lower portion of the canister 43 can be increased in minimum ground height. Thus, the bank angle of the vehicle 1 can largely be ensured.

The canister 43 and the right seat rail 14 overlap each other as viewed from above; therefore, the canister 43 can be disposed on the inside in the vehicle-width direction, so that the bank angle of the motorcycle 1 can largely be ensured.

Further, the step frame 23R is disposed in the posterior-superior direction. The canister 43 is disposed such that the axis 123 extends in the posterior-superior direction along the step floor 23R. The charge pipe 113 connecting the canister 43 with the fuel tank 40 is connected to the rear portion of the canister 43. Thus, the evaporated fuel in the fuel tank 40 can easily be supplied through the charge pipe 113 to the rear portion of the canister 43 disposed in the posterior-superior direction. The canister 43 can be disposed in the posterior-superior direction by the use of the inclination of the step frame 23R without the use of a dedicated stay or the like.

DESCRIPTION OF REFERENCE SYMBOLS

1 Motorcycle (saddle-ride type vehicle)
11 Main frame
12 Head pipe
13, 13 Down tube
14, 14 Seat rail
15, 15 Upper tube
23L Step frame
23R Step frame (one of the step frames)
40 Fuel tank
41 Radiator
43 Canister
46 Reservoir tank
68, 68 Step floor
113 Charge pipe (pipe to connect the canister with the fuel tank)
123 Axis
126 Center tunnel portion
127 Longitudinal wall portion
C Body cover
E Engine
F Body frame

What is claimed is:

1. A saddle-ride type vehicle comprising: a canister arrangement structure in which a canister for adsorbing evaporated fuel in a fuel tank is disposed below step floors on which feet of an occupant are placed,
   wherein the step floors are installed as a left and right pair and are directly supported from below by left and right step frames, a main frame of the vehicle has a head pipe and down tubes, the step frames located outwardly away from the main frame in a vehicle-width direction and connected to the down tubes, the step frames extending in a back and forth direction on the outside of the down tubes in the vehicle-width direction to define spaces between the main frame and the step frames which are covered from above by the step floors, the step frames disposed inside of a body cover which covers the step frames from the sides, and the canister is disposed in one space on the inside of one step frame in the vehicle-width direction and is supported by the one step frame.

2. The saddle-ride type vehicle according to claim 1, wherein the down tubes are configured as a left and right pair, extending downward from the head pipe, then bending and extending rearward below the step frames, and
   the down tubes are located below the canister as viewed from the side.

3. The saddle-ride type vehicle according to claim 1, wherein a radiator for an engine of the vehicle is installed in a front portion of the vehicle, a reservoir tank of the radiator is installed behind the radiator, and the canister is disposed behind the reservoir tank.

4. The saddle-ride type vehicle according to claim 1, wherein the canister and the fuel tank overlap each other as viewed from the side.

5. The saddle-ride type vehicle according to claim 1, wherein the vehicle has a unit swing type engine connected to a rear portion of the main frame, the fuel tank being supported by a front portion of the main frame, and the canister is disposed between the fuel tank and the engine as viewed from the side.

6. The saddle-ride type vehicle according to claim 2, wherein the main frame includes seat rails configured as a left and right pair, the seat rails being disposed above the down tubes, having front ends connected to the corresponding down tubes and extending in a rearward and upward direction; and left and right upper tubes disposed above the down tubes and connecting a front portion of the main frame with the seat rails, the body cover of the vehicle has a center tunnel portion, the center tunnel portion covering the left and right upper tubes from above and having a lower edge joined to upper surfaces of the left and right step floors, and a longitudinal wall portion of the center tunnel portion joined to the one step frame overlaps the canister as viewed from above.

7. The saddle-ride type vehicle according to claim 6, wherein the canister and the seat rail overlap each other as viewed from above.

8. The saddle-ride type vehicle according to claim 1, wherein step frames are disposed in a posterior-superior direction, the canister is disposed such that an axis extends in the posterior-superior direction along the step frames, and a pipe connecting the canister with the fuel tank is connected to a rear portion of the canister.

9. The saddle-ride type vehicle according to claim 2, wherein a radiator for an engine of the vehicle is installed in a front portion of the vehicle, a reservoir tank of the radiator is installed behind the radiator, and the canister is disposed behind the reservoir tank.

10. The saddle-ride type vehicle according to claim 2, wherein the canister and the fuel tank overlap each other as viewed from the side.

11. The saddle-ride type vehicle according to claim 3, wherein the canister and the fuel tank overlap each other as viewed from the side.

12. The saddle-ride type vehicle according to claim 2, wherein the vehicle has a unit swing type engine connected to a rear portion of the main frame, the fuel tank being supported by a front portion of the main frame, and the canister is disposed between the fuel tank and the engine as viewed from the side.

13. The saddle-ride type vehicle according to claim 3, wherein the vehicle has a unit swing type engine connected to a rear portion of the main frame, the fuel tank being supported by a front portion of the main frame, and the canister is disposed between the fuel tank and the engine as viewed from the side.

14. The saddle-ride type vehicle according to claim 4, wherein the vehicle has a unit swing type engine connected to a rear portion of the main frame, the fuel tank being supported by a front portion of the main frame, and the canister is disposed between the fuel tank and the engine as viewed from the side.

* * * * *